United States Patent [19]

Imanaka

[11] Patent Number: 4,651,071
[45] Date of Patent: Mar. 17, 1987

[54] BRAKE CONTROL SYSTEM FOR SUPPLEMENTING ELECTRIC BRAKE WITH FRICTION BRAKE

[75] Inventor: Asaji Imanaka, Kobe, Japan

[73] Assignee: Nippon Air Brake Co., Ltd., Kobe, Japan

[21] Appl. No.: 852,673

[22] Filed: Apr. 16, 1986

[30] Foreign Application Priority Data

Apr. 23, 1985 [JP] Japan ................................ 60-88347

[51] Int. Cl.⁴ ............................................ H02P 3/16
[52] U.S. Cl. .................................. 318/371; 318/370; 105/61; 303/3; 303/20
[58] Field of Search ...................... 318/370, 371, 372; 105/61; 188/33, 34, 38, 38.5, 107, 137; 303/2, 3, 20, 24 B, 24 BB

[56] References Cited

U.S. PATENT DOCUMENTS

| | | | |
|---|---|---|---|
| 3,488,570 | 1/1970 | Vint, Jr. et al. ................. | 318/371 X |
| 3,560,054 | 2/1971 | Sarbach ................................ | 303/20 |
| 3,774,095 | 11/1973 | Coccia .................................. | 318/371 |
| 4,278,298 | 7/1981 | Sauka et al. ............................ | 303/3 |

FOREIGN PATENT DOCUMENTS 1438812 2/1969 Fed. Rep. of Germany ...... 318/371

Primary Examiner—William M. Shoop, Jr.
Assistant Examiner—Bentsu Ro
Attorney, Agent, or Firm—G. J. Falce

[57] ABSTRACT

A brake control system for a railway car having a primary electric brake and a secondary friction brake that supplements the electric brake as the electric brake effectiveness fades. The secondary friction brake is normally applied in accordance with a first supplementary control signal provided by an electrical component, such as an operational amplifier, the output of which is the difference between a brake command signal and the actual braking produced by the electric brake. A second supplementary control signal corresponding to the brake command signal is effective to control the secondary friction brake, in response to either anomalies in the power supply or failure of the operational amplifier. A switch connects the brake command signal to an electric-pneumatic converter to provide pneumatic pressure to the friction brake corresponding to the brake command, and to concurrently terminate operation of the electric brake, when either one or both of the foregoing abnormalities are detected.

17 Claims, 3 Drawing Figures

BRAKE CONTROL SYSTEM FOR SUPPLEMENTING ELECTRIC BRAKE WITH FRICTION BRAKE

BACKGROUND OF THE INVENTION

This invention relates to a pneumatic brake control device which is used in the electric cars of railroad vehicles, and it normally supplements any insufficiencies in the electric braking force portion of the total braking force; and when this electric braking force becomes ineffective, then it provides the total braking force.

A known arrangement (as shown in FIG. 3) includes dispatch lines SB1, SB2, and SB3 over which a 3-bit digital electrical signal (brake command) is given by the brake controller (not shown), a brake command receiver 1 consisting of the normal first receiver 11 and the backup second receiver 12, an electrical braking device EB, an electric-pneumatic converter EP, a multi-way valve RV with solenoid valves MV1, MV2, and MV3, a brake cylinder BC, and a source of compressed air MR.

The first receiver 11 has the receiver RE, the brake force pattern set-up device BS, and the operator OP, and receives the brake command signal, transmitting it to the electrical brake device EB; and at the same time, the electrical signal (equivalent dispatch) corresponding to the actual electrical braking force is fed back from the electrical brake device EB, and the equilavent signal is subtracted from the brake command signal at the operator OP, and the result is transmitted to the electric-pneumatic converter valve EP as the first supplementary brake command signal.

The second receiver 12 includes a detection relay R, which demagnetizes in response to any loss of the power source or an abnormal voltage-drop below a defined value. The contact point Ra of relay R is normally open, and its contact Rb is normally closed. When the power source is operating normally, the contacts Ra and Rb are in the positions shown in the FIGURE. Under abnormal power source conditions, the normally open contact Ra is open and interrupts operation of the first receiver 1 and, at the same time, the normally closed contact port Rb is closed and the brake command signal is transmitted to the solenoid valves MV1, MV2, and MV3 as the second supplementary brake command.

Since the electric-pneumatic converter valve EP, the solenoid valves MV1, MV2, and MV3, and the multi-way connection valve RV are well known, an explanation of these devices will not be undertaken here.

As described above, a conventional brake control device for electric cars outputs an electrical signal according to the deficit portion of the electrical braking force in relation to the total braking force via the first receiver 11, when the power source of the first receiver 11 is normal, as the first supplementary command, and this signal is converted to air pressure by the electric-pneumatic converter valve EP. Based on the air pressure, the pressure of the brake cylinder BC is regulated and when the power source of the receiver 11 becomes abnormal, the brake command is output as the second supplementary command by the second receiver 12 acting as a backup, and this is converted to air pressure by the multi-way valve RV with solenoid valves, and based on this air pressure, the pressure of the brake cylinder BC is controlled.

In the arrangement according to the prior art described above, since the malfunction of the first receiver 11 is evaluated solely as a function of the anomaly of the power source, if the power source is normal but for example, the operator OP controlling the first receiver 11 malfunctions, then the second supplementary command by the second receiver 12, namely the backup brake command, is not output, and hence, the reliability of the pneumatic brake device is low. Also, due to the fact that the multi-way valve RV including the solenoid valves MV1, MV2, and MV3, provide backup service and are therefore used only occasionally in order to convert the second supplementary brake command to air pressure, the weight and the space occupied, as well as the initial costs cannot be justified. Also, there is the problem of high cost for the performance of maintenance and inspections which must be done periodically, irrespective of the amount of use.

SUMMARY OF THE INVENTION

It is therefore an object of the present invention to provide increased reliability of the pneumatic supplementary brake control apparatus by detecting a malfunction of the first receiver related to the electrical device by which the first supplementary brake command is formed according to the deficiency in the electric brake effectiveness, as well as a malfunction related to an anomaly of the power supplied to the first receiver.

It is another object of the invention to provide a more cost-effective arrangement by eliminating the multi-way valve by which the second supplementary brake command is formed.

Briefly, the objectives are achieved by providing a first receiver for normal use, which receives the brake command consisting of electrical signals and transmits it to the electrical braking device, and also receives equivalent-command feedback which consists of the electrical signal corresponding to the actual electrical brake force from the electrical braking device, and subtracts the equivalent command from the above-mentioned brake command and outputs that result as a first supplementary brake command, and a second receiver as a backup, which detects anomalies of the power source in the above-mentioned first receiver and outputs the above-mentioned brake command as a second supplementary brake command.

The pneumatic brake control device controls the brake cylinder pressure based on the air pressure corresponding to the first supplementary command or to the second supplementary command described above.

The second receiver described above consists of a first detector which detects a power source anomaly of the first receiver, a detector which detects a malfunction of the first receiver by comparing the sum of the effective electric brake signal and the first supplementary command mentioned above with the brake command, and switch means which converts the brake command into the second supplementary command.

The switch selects the first supplementary brake command when neither of the two detectors detects a malfunction, and selects the second supplementary brake command when at least one of the detectors is in the detecting mode, and transmits either the first or the second supplementary brake command to the electric-pneumatic converter valve EP.

When the first receiver and its power source are normal (since both detectors do not detect), the switch selects the first supplementary command and sends it to the electric-pneumatic conversion valve. When an anomaly in the power source and/or a malfunction in the first receiver occurs, then the first detector KC or the second detector CO or both go into the detecting mode; the switch selects the second supplementary command for backup and transmits it to the electric-pneumatic converter valve EP. In the case of either the first or the second supplementary brake command, the brake cylinder pressure is controlled based on the air pressure which represents the output of the electric-pneumatic converter valve EP corresponding to these supplementary brake commands.

BRIEF EXPLANATION OF THE DRAWINGS

These and other objects and attendant advantages will become apparent from the following more detailed explanation, when taken in accordance with the accompanying drawings, wherein.

DESCRIPTION AND OPERATION

Several embodiments of this invention will be explained below with reference to FIGS. 1 and 2. Those parts which are identical to the models of the prior art are identified by the same symbols as in FIG. 3.

Figure 1:
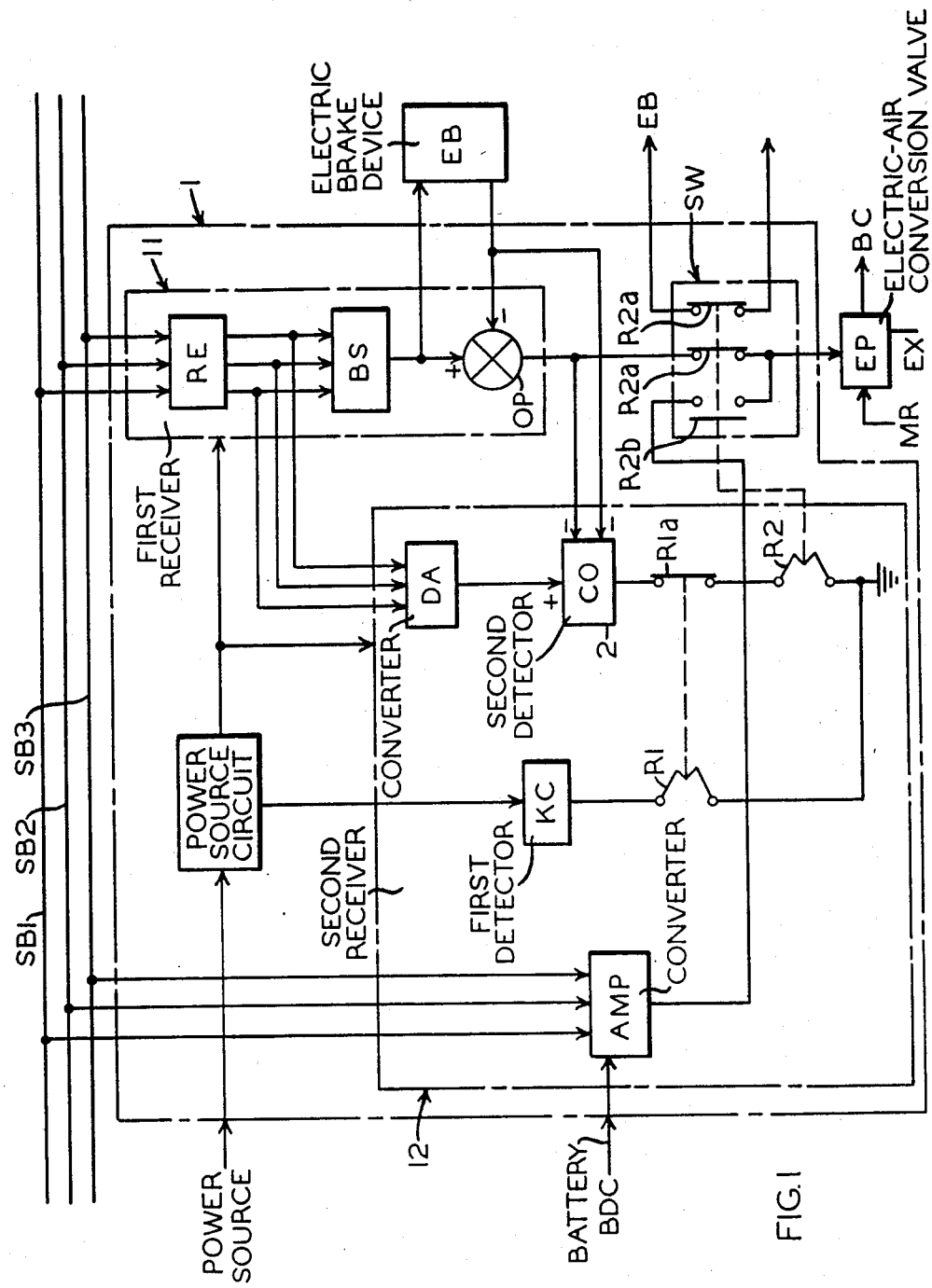
FIG. 1 is a schematic diagram showing a first embodiment of the present invention.

In FIG. 1 for the first embodiment, the second receiver 12 includes a first detector KC, a first detection relay R1, its normally open contact R1a, a digital-analog converter DA, a second detector CO, a second detection relay R2, and a digital-analog converter AMP. In addition, a switch SW consists of a normally open contact R2a of the above second detection relay R2, and a normally closed contact R2b. In addition, the AC or DC voltages of the power source supplies are a function of the requirements of the various component parts.

The first detector KC monitors the power source circuit and if normal, excites the first detection relay R1 when the voltage is over a specified value; and if the voltage of the power source is less than or greater than the specified value, it identifies the situation as abnormal and demagnetizes the first detection relay R1.

The second detector CO compares the sum of the first supplementary command from operational amplifier OP and the effective electric brake signal from the electric brake device EB, with the brake command from the digital-analog converter DA, and when the difference is less than a predetermined value, it determines that the first receiver 11 is normal and sets its output to a logic (1); and when the difference is greater than a predetermined value, it is evaluated as a malfunction of the first receiver 11 and its output is set to a logic (0).

The second detection relay R2 is connected to the second detector CO through the normally open contact point R1a of the first detection relay R1 described above. When the first detection relay R1 is excited and also the output of the second detector CO is (1), that is, both the power source voltage and the first receiver 11 are normal, the relay R2 is excited. It is demagnetized when the first detection relay R1 is demagnetized or the second detector CO output is (0), that is, both the power source voltage is abnormal and the first receiver 11 is malfunctioning, or both of the foregoing abnormal conditions exist.

Therefore, when both the power source voltage and the first receiver 11 are normal, the above-mentioned detectors KC and CO both are not in the detecting mode and the first detection relay R1 is excited and its normally open contact point R1a is closed, and also the second detection relay R2 is excited and its normally open contact point R2a is closed, while the normally closed contact point R2b is open and therefore the first supplementary command from operational amplifier OP is transmitted to the electric-pneumatic converter valve EP. Specifically in this case, based on non-detection by both detectors KC and CO in the second receiver 12, the switch SW selects the first supplementary brake command from the first receiver 11 and based on the output air pressure of the electric-pneumatic converter valve EP corresponding to the first supplementary brake command, the pressure of the brake cylinder BC is controlled.

Also, when the power source becomes abnormal or the first receiver 11 malfunctions or when both of these conditions exist, the second detection relay R2 is demagnetized and its normally open contact point R2a opens and at the same time, the normally closed contact point R2b closes and therefore the second supplementary command from the converter AMP is transmitted to the electric-pneumatic converter valve EP. In this case, at least one of the two detectors KC or CO in the second receiver 12 is in the detection mode, and consequently the switch WS selects the second supplementary brake command for the backup from the second receiver 12, and the pressure of the brake cylinder BC is controlled based on the output air pressure of the electric-pneumatic converter valve EP corresponding to the brake command. Concurrently, the normally open contact R2 at the right end of the switch SW is opened to terminate the action of the electric brake device EB.

In addition, a command corresponding to the load is generally added to the brake command, but this was omitted in the explanation of the above example. In other words, in the first embodiment illustrated in FIG. 1, the command corresponding to the load may be additionally inputted to the brake force pattern setup device BS and the digital-analog converter DA, so that the brake command and the first supplementary brake command reflect the vehicle weight. The command corresponding to the load may be additionally inputted to the converter AMP of the second receiver 12, so that the second supplementary brake command also reflects the vehicle weight. Also, an initial command may be added to the first and the second supplementary commands.

Figure 2:
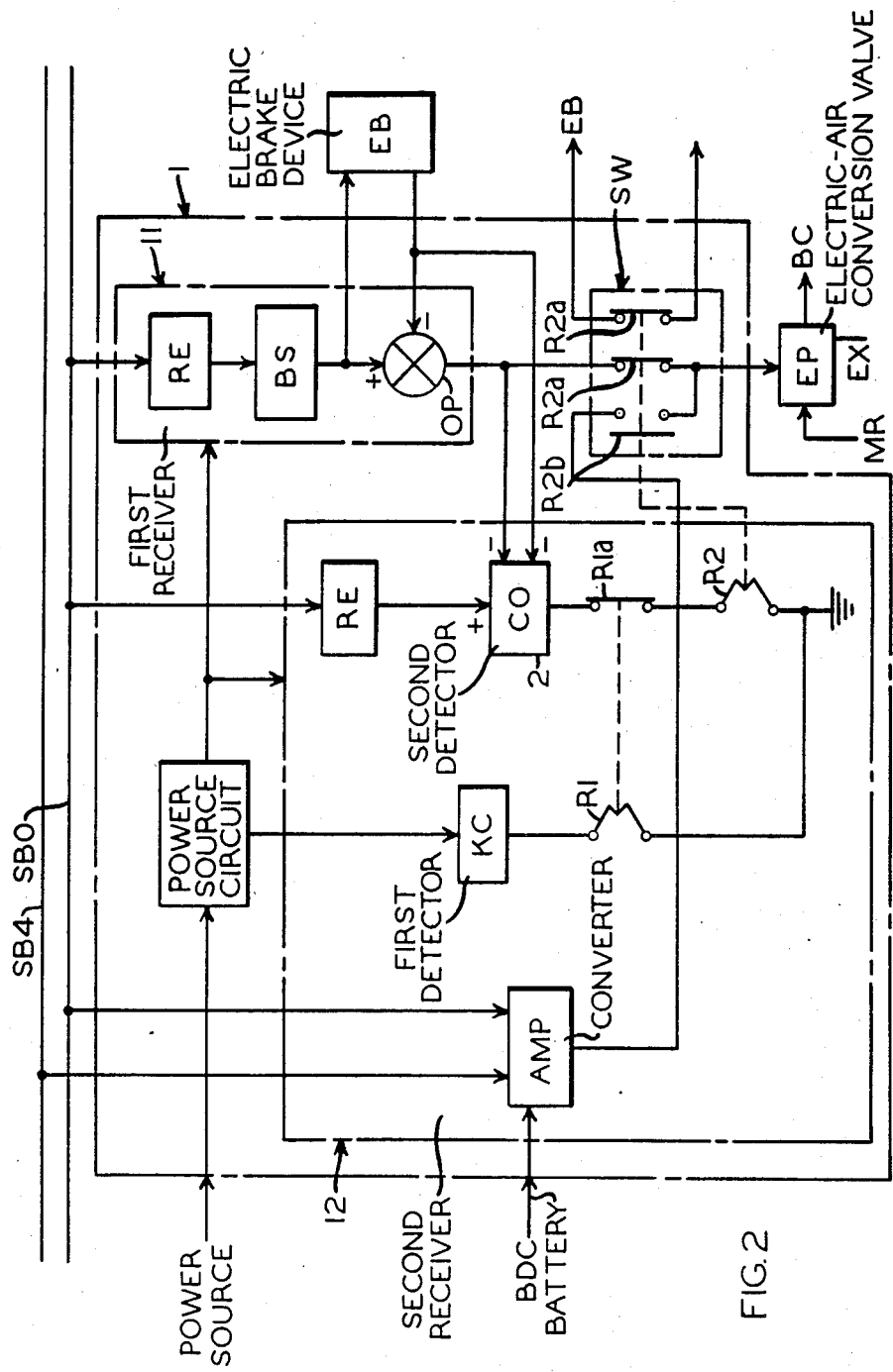
FIG. 2 is a schematic diagram showing a second embodiment of the present invention.
Figure 3:
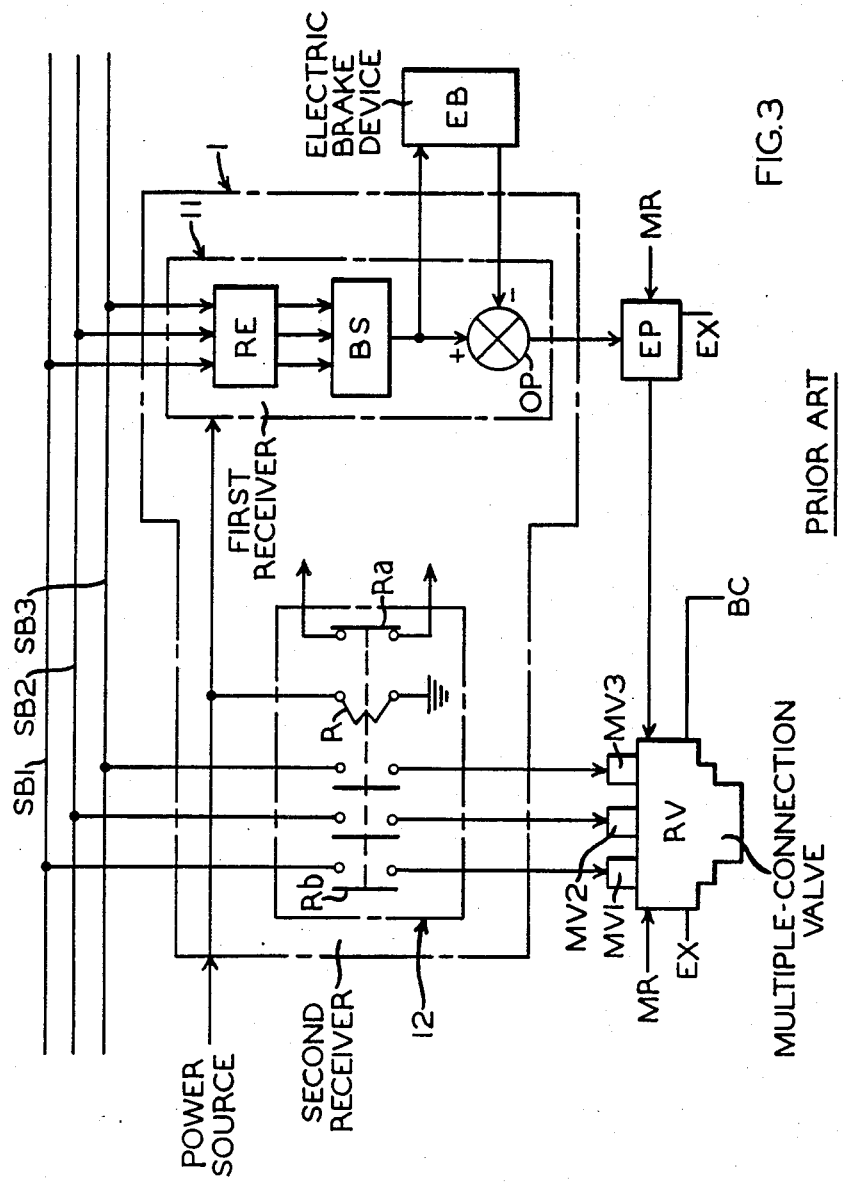
FIG. 3 is a system diagrammatic showing a known arrangement over which the present invention is an improvement.

The second embodiment shown in FIG. 2 differs from the first embodiment in that the brake command is analog and the initial command is added to the converter AMP of the second receiver 12, but it is identical in all other respects, and hence, no explanation is given here. Also in this second embodiment, the command corresponding to the load is generally added, as in the first embodiment.

As is clear from the above explanation, the addition of a second detector to detect a malfunction of the first receiver (by comparing the sum of the feedback signal corresponding to the actual electrical brake force and the first supplementary command which is equivalent to the supplementary pneumatic brake force, with the brake command that corresponds to the total brake force) increases the reliability of the pneumatic brake device equipped with the backup brake. The apparatus is also designed so that the first supplementary brake command from the first receiver, or the second supplementary brake command from the second receiver can be converted to the air pressure corresponding to each supplementary command by only one electric-pneumatic converter valve, whereby the multi-way valve with multiple solenoid valves in the conventional device becomes unnecessary. Therefore, the weight and the space required are reduced that much and, at the same time, the initial cost and the operating and maintenance costs can be reduced accordingly.

The following is a list of the nomenclature of components shown in the drawings:

1 brake receiver
12 second receiver
R1 first detection relay
R2 second detection relay
SW switch
EP electric-pneumatic converter valve
11 first receiver
KC first detector
CO second detector
AMP converter
EB electric brake device
BC brake cylinder

I claim:

1. A brake control system for a railway car including means for providing a brake command signal, an electric brake, first signal receiving means for connecting said brake command signal to said electric brake and for providing a first supplementary brake command signal when a feedback signal corresponding to the effectiveness of said electric brake is less than said brake command signal, and friction brake means for supplementing said electric brake, comprising:
   (a) second signal receiving means for providing a second supplementary brake command signal corresponding to said brake command signal;
   (b) a source of electric power;
   (c) circuit means for connecting said source of electric power to said first signal receiving means;
   (d) said first signal receiving means including an operational amplifier having an electrical output providing said first supplementary brake command signal in accordance with a difference between said brake command signal and said electric brake feedback signal;
   (e) said second signal receiving means including
       (i) first detector means for providing a first malfunction signal when an anomaly of said power source is detected at said circuit means; and
       (ii) second detector means for providing a second malfunction signal when a difference between said brake command signal and sum of said first supplementary brake command signal and said electric brake feedback signal exceeds a predetermined amount; and
   (f) switch means for normally connecting said first supplementary brake command signal to said friction brake means, and for connecting said second supplementary brake command signal to said friction brake means, when either one or both of said first and second malfunction signals exist.

2. A brake control system, as recited in claim 1, wherein said switch means disables and electric brake concurrently with said connection of said second supplementary brake command signal to said friction brake means.

3. A brake control system, as recited in claim 1, wherein said friction brake means includes an electro-pneumatic converter valve to which one of said first and second supplementary brake command signals is connected to provide pneumatic pressure corresponding thereto to operate said friction brake means accordingly.

4. A brake control system, as recited in claim 1, wherein said brake command signal is an electric binary code signal.

5. A brake control system, as recited in claim 4, wherein said second signal receiving means includes an electrical digital-analog converter having an input subject to said electric code signal, and an output providing said second supplementary brake command signal.

6. A brake control system, as recited in claim 4, wherein said second signal receiving means includes an electrical digital-analog converter having an input subject to said electric binary code signal, and an output providing said brake command signal in analog form.

7. A brake control system, as recited in claim 4, wherein said second signal receiving means includes:
   (a) a first electrical digital-analog converter having an input subject to said electric binary code signal, and an analog output providing said second supplementary brake command signal; and
   (b) a second electrical digital-analog converter having an input subject to said electric binary code signal, and an output providing said brake command signal in analog form at said second detector means.

8. A brake control system, as recited in claim 7, wherein said switch means comprises:
   (a) a first relay subject to said second malfunction signal;
   (b) a first normally closed contact of said first relay via which said first supplementary brake command signal is connected to said friction brake means, said first normally closed contact of said first relay being open in response to said second malfunction signal; and
   (c) a normally open contact of said first relay via which said second supplementary brake command signal is connected to said friction brake means, said normally open contact being closed in response to said second malfunction signal.

9. A brake control system, as recited in claim 8, wherein said switch means further comprises:
   (a) a second relay subject to said first malfunction signal; and
   (b) a normally closed contact of said second relay via which said second malfunction signal is connected to said first relay, said normally closed contact of said second relay being open in response to said first malfunction signal to interrupt said second malfunction signal from said first relay.

10. A brake control system, as recited in claim 9, wherein said switch means further comprises a second normally closed contact of said first relay via which said electric brake is enabled, said second normally closed contact being open in response to said second malfunction signal to disable said electric brake.

11. A brake control system, as recited in claim 10, wherein said friction brake means includes an electric-pneumatic converter valve to which one of said first and second supplementary brake command signals is connected to provide pneumatic pressure corresponding thereto to operate said friction brake means accordingly.

12. A brake control system, as recited in claim 1, wherein said brake command signal is an electric analog signal.

13. A brake control system, as recited in claim 12, wherein said second signal receiving means includes:
   (a) first electrical amplifier means having an input subject to said analog brake command signal, and an analog output providing said second supplementary brake command signal; and
   (b) second electrical amplifier means having an input subject to said analog brake command signal, and an output providing said brake command signal in analog form at said second detector means.

14. A brake control system, as recited in claim 13, wherein said switch means comprises:
   (a) a first relay subject to said second malfunction signal;
   (b) a first normally closed contact of said first relay via which said first supplementary brake command signal is connected to said friction brake means, said first normally closed contact of said first relay being open in response to said second malfunction signal; and
   (c) a normally open contact of said first relay via which said second supplementary brake command signal is connected to said friction brake means, said normally open contact being closed in response to said second malfunction signal.

15. A brake control system, as recited in claim 14, wherein said switch means further comprises:
   (a) a second relay subject to said first malfunction signal; and
   (b) a normally closed contact of said second relay via which said second malfunction signal is connected to said first relay, said normally closed contact of said second relay being open in response to said first malfunction signal to interrupt said second malfunction signal from said first relay.

16. A brake control system, as recited in claim 15, wherein said switch means further comprises a second normally closed contact of said first relay via which said electric brake is enabled, said second normally closed contact being open in response to said second malfunction signal to disable said electric brake.

17. A brake control system, as recited in claim 16, wherein said friction brake means includes an electric-pneumatic converter valve to which one of said first and second supplementary brake command signals is connected to provide pneumatic pressure corresponding thereto to operate said friction brake means accordingly.

* * * * *

UNITED STATES PATENT AND TRADEMARK OFFICE
CERTIFICATE OF CORRECTION

PATENT NO. : 4,651,071
DATED : March 17, 1987
INVENTOR(S) : Asaji Imanaka

It is certified that error appears in the above-identified patent and that said Letters Patent are hereby corrected as shown below:

Column 6, Claim 2, line 2, delete "and" and insert --said--

Column 6, Claim 3, lines 7-8, delete "electro-pneumatic" and insert --electric-pneumatic--

Column 6, Claim 5, line 19, after "electric", insert --binary--

Signed and Sealed this

Twenty-ninth Day of September, 1987

Attest:

DONALD J. QUIGG

Attesting Officer     Commissioner of Patents and Trademarks